United States Patent
Copeland et al.

(10) Patent No.: US 9,091,158 B2
(45) Date of Patent: Jul. 28, 2015

(54) PROCESSING OIL FROM STEAM ASSISTED PRODUCTION

(75) Inventors: Chris R. Copeland, Bartlesville, OK (US); Cory B. Phillips, Bartlesville, OK (US); Roland Schmidt, Bartlesville, OK (US)

(73) Assignee: ConocoPhillips Company, Houston, TX (US)

( * ) Notice: Subject to any disclaimer, the term of this patent is extended or adjusted under 35 U.S.C. 154(b) by 982 days.

(21) Appl. No.: 13/236,159

(22) Filed: Sep. 19, 2011

(65) Prior Publication Data
US 2012/0074041 A1    Mar. 29, 2012

Related U.S. Application Data

(60) Provisional application No. 61/386,748, filed on Sep. 27, 2010.

(51) Int. Cl.
| | |
|---|---|
| *B01D 21/01* | (2006.01) |
| *C02F 1/56* | (2006.01) |
| *E21B 43/24* | (2006.01) |
| *E21B 43/30* | (2006.01) |
| *C09K 8/592* | (2006.01) |

(52) U.S. Cl.
CPC .............. *E21B 43/2406* (2013.01); *C09K 8/592* (2013.01); *E21B 43/305* (2013.01)

(58) Field of Classification Search
CPC ......... B01D 21/01; C02F 1/56; E21B 21/063; E21B 21/065; E21B 43/24; E21B 43/2406
USPC .............. 166/266, 267, 272.3; 210/702, 732, 210/733, 747.1
See application file for complete search history.

(56) References Cited

U.S. PATENT DOCUMENTS

| | | | |
|---|---|---|---|
| 4,334,985 | A | 6/1982 | Turner, Jr. |
| 5,080,809 | A | 1/1992 | Stahl et al. |
| 5,147,045 | A | 9/1992 | Chi et al. |
| 5,326,864 | A | 7/1994 | Besemer et al. |
| 5,643,460 | A * | 7/1997 | Marble et al. ............. 210/705 |
| 6,068,693 | A | 5/2000 | Garforth et al. |
| 6,451,885 | B1 | 9/2002 | Dresin et al. |
| 2007/0102359 | A1 | 5/2007 | Lombardi et al. |

FOREIGN PATENT DOCUMENTS

| | | |
|---|---|---|
| CA | 1145284 | 4/1983 |
| GB | 1359932 | 7/1974 |
| WO | 2009052362 | 4/2009 |

OTHER PUBLICATIONS

PCT/US11/052146 Search Report dated Mar. 27, 2012, ISA/US, 4 pgs.

* cited by examiner

*Primary Examiner* — Catherine Loikith
(74) *Attorney, Agent, or Firm* — ConocoPhillips Company

(57) ABSTRACT

Methods and apparatus relate to treating hydrocarbons recovered with steam condensate from a formation. The treating removes particulates from the hydrocarbons by addition of a flocculant to produced fluids containing the hydrocarbons and an aqueous phase with the condensate. The flocculant causes the particulates suspended in the hydrocarbons to agglomerate and be transferred to the aqueous phase, which is then separated from the hydrocarbons.

19 Claims, 1 Drawing Sheet

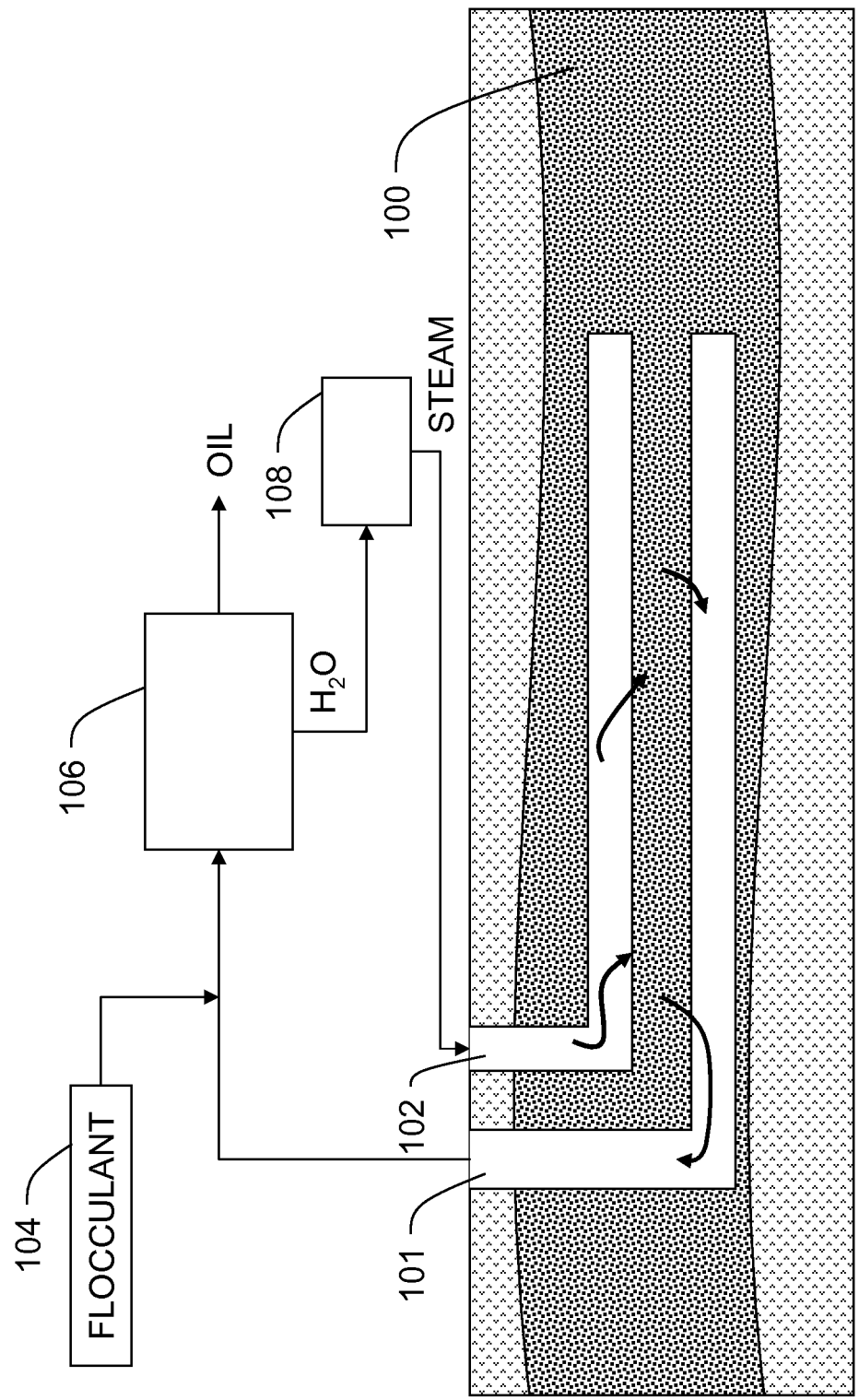

PROCESSING OIL FROM STEAM ASSISTED PRODUCTION

CROSS-REFERENCE TO RELATED APPLICATIONS

This application is a non-provisional application which claims the benefit of and priority to U.S. Provisional Application Ser. No. 61/386,748 filed Sep. 27, 2010, entitled "Processing Oil from Steam Assisted Production," which is hereby incorporated by reference in its entirety.

STATEMENT REGARDING FEDERALLY SPONSORED RESEARCH OR DEVELOPMENT

None

FIELD OF THE INVENTION

Embodiments of the invention relate to methods and systems for processing of oil, which is recovered utilizing steam injection into a hydrocarbon-bearing formation.

BACKGROUND OF THE INVENTION

In order to recover oil from certain geologic formations, injection of steam increases mobility of the oil within the formation via an exemplary process known as steam assisted gravity drainage (SAGD). Production fluid flows from solids that remain in the formation and thus includes the oil and condensate from the steam. A free-water knock-out unit located proximate a producing well site separates water out of the production fluid for sustaining operations by resupplying feed water needed to generate additional steam injected into the formation.

However, refining of the oil derived from the operations that utilize such steam injection can present problems. Tight water emulsions that can result when treating the oil in desalting units make subsequent breakout of the oil from brine difficult. Further, the oil can cause premature fouling and buildup of deposits in equipment such as crude towers and hydrotreating guard beds.

One prior approach to limit the problems caused by the oil relies on adjusting of crude blends and flows during the refining. Such adjustment may enable processing of the oil but may otherwise be undesirable. Factors influencing suitability of other processing techniques for the oil include additional equipment costs and operating pressure and temperature.

Therefore, a need exists for improved methods and systems for processing of oil obtained from steam injection based operations.

BRIEF SUMMARY OF THE DISCLOSURE

In one embodiment, a method of generating treated production includes injecting steam into a formation containing hydrocarbons and recovering products including the hydrocarbons and condensate from the steam. Mixing a flocculant with the products causes particles suspended in the hydrocarbons to agglomerate and be transferred to an aqueous phase that includes the condensate. The method further includes separating the aqueous phase from the hydrocarbons, which have the particles removed to facilitate further processing of the hydrocarbons.

According to one embodiment, a method of generating treated production includes mixing a polymeric flocculant with products recovered from a wellbore and while still above 100° C. The particles suspended in hydrocarbons of the products agglomerate due to the flocculant and are transferred to an aqueous phase of the products. In addition, the method includes separating the aqueous phase from the hydrocarbons, which have the particles removed to facilitate further processing of the hydrocarbons.

For one embodiment, a method of generating treated production includes recovering fluid products removed by a wellbore from solids of a formation and mixing a flocculant with the products that are recovered. Particles suspended in hydrocarbons of the products agglomerate due to the flocculant and are transferred to an aqueous phase of the products. The method also includes separating the aqueous phase from the hydrocarbons, which have the particles removed to facilitate further processing of the hydrocarbons.

BRIEF DESCRIPTION OF THE DRAWINGS

A more complete understanding of the present invention and benefits thereof may be acquired by referring to the following description taken in conjunction with the accompanying drawings.

FIG. 1 is a schematic of a steam assisted recovery system for treating production to remove particulate from oil by addition of a flocculant, according to one embodiment of the invention.

DETAILED DESCRIPTION

Turning now to the detailed description of the preferred arrangement or arrangements of the present invention, it should be understood that the inventive features and concepts may be manifested in other arrangements and that the scope of the invention is not limited to the embodiments described or illustrated. The scope of the invention is intended only to be limited by the scope of the claims that follow.

Embodiments of the invention relate to treating hydrocarbons recovered with steam condensate from a formation. The treating removes particulates from the hydrocarbons by addition of a flocculant to produced fluids containing the hydrocarbons and an aqueous phase with the condensate. The flocculant causes the particulates suspended in the hydrocarbons to agglomerate and be transferred to the aqueous phase, which is then separated from the hydrocarbons.

FIG. 1 shows a steam assisted recovery system for treating production to remove particulate from hydrocarbons drained from a subterranean reservoir 100. A production well 101 and an injection well 102 traverse through an earth formation into the reservoir 100 containing the hydrocarbons, such as heavy oil or bitumen. In operation, steam injected through the injection well 102 makes the hydrocarbons mobile enough to enable or facilitate recovery with the production well 101. Heat transfer from the steam to the hydrocarbons mobilizes the hydrocarbons in the formation for recovery through the production well 101. This mobilization of the hydrocarbons enables removal of the hydrocarbons from solids of the reservoir 100 without relying on emulsification of the hydrocarbons with water.

For some embodiments, the injection well 102 includes a horizontal borehole portion that is disposed above (e.g., 0 to 6 meters above) and parallel to a horizontal borehole portion of the production well 101. The steam upon exiting the injection well 102 and passing into the reservoir 100 condenses and contacts the hydrocarbons to create a mixture of the hydrocarbons and condensate from the steam. The mixture migrates through the reservoir 100 due to gravity drainage and is gathered at the production well 101 through which the mixture is recovered as products to surface. While shown by example in a steam assisted gravity drainage well pair orientation, some embodiments utilize other configurations of the injection well 102 and the production well 101, which may be combined with the injection well 102, offset vertically relative to the injection well 102, or arranged crosswise relative to the injection well 102, for example. Further, the treatment process described herein may rely on other steam and wellbore based production techniques, such as use of steam as a drive fluid, for wet in-situ combustion, or in cyclic injecting and producing during alternating periods of time.

Once the products are recovered from the reservoir 100, a reagent source 104 couples in fluid communication with flow of the products for addition of a flocculant to the products. The flocculant causes particles suspended in the hydrocarbons to agglomerate. The particles that are agglomerated transfer to an aqueous phase that includes the condensate.

In some embodiments, the flocculant includes polymeric compounds with surfaces active for interacting with the particles. The polymeric compounds may include cationic or anionic polymers, which may be copolymers. For some embodiments, suitable monomers forming at least part of the polymeric compounds include imides, acrylate, amides, imines and/or amines. For example, the reagent source 104 may contain the flocculant that is a polyethyleneimine or is a polyacrylamide with a charged ionic co-monomer, such as acrylate.

The polymeric compounds forming the flocculant withstand being introduced into the products while the products are still at temperatures above 100° C., between 100° C. and about 175° C., between 100° C. and about 150° C., or at about 120° C. and are at pressures above 550 kilopascal (kPa), between about 550 kPa and about 1375 kPa, or between about 690 kPa and about 1034 kPa. When the flocculant is introduced into the products, the products contain a ratio of the condensate to the hydrocarbons of between about 1 and about 4. The polymeric compounds utilized as the flocculant provide agglomeration of the particles without relying on additional water being added to aid invoking of surface charging.

In some embodiments, the particles that are suspended in the hydrocarbons include clays, such as kaolin, and have average particle size dimensions of less than about 100 nanometers before being agglomerated or less than about 20 nanometers before being agglomerated. While the hydrocarbons without treatment to remove the particles as described herein may pass through pipelines and enter refineries due to smallness of the particles, the particles can cause problems in downstream operations by being responsible for formation of tight water emulsions in desalting units and fouling of equipment used in the downstream operations. Addition of the flocculant agglomerates the particles to average particle sizes of greater than 100 nanometers.

A separator 106 or free-water knock-out unit removes the hydrocarbons from the aqueous phase containing the condensate with the particles that agglomerated due to addition of the flocculant. The separator 106 outputs the hydrocarbons that thereby have the particles removed to facilitate further processing of the hydrocarbons. Remaining water that is left once the hydrocarbons are removed also outputs from the separator 106 and may feed a steam generator 108 coupled to introduce the steam into the injection well 102. For some embodiments, the separator 106 or a solid-liquid separating device treats the remaining water by removing the particles that agglomerated. Removal of the particles from the hydrocarbons and/or the condensate may employ equipment already required for handling the products thus limiting additional assets needed. Coupling the reagent source 104 inline with flow of the products from the production well 101 to the separator 106 protects the downstream operations and avoids restrictions on ability to process the hydrocarbons.

In closing, it should be noted that the discussion of any reference is not an admission that it is prior art to the present invention, especially any reference that may have a publication date after the priority date of this application. At the same time, each and every claim below is hereby incorporated into this detailed description or specification as additional embodiments of the present invention.

Although the systems and processes described herein have been described in detail, it should be understood that various changes, substitutions, and alterations can be made without departing from the spirit and scope of the invention as defined by the following claims. Those skilled in the art may be able to study the preferred embodiments and identify other ways to practice the invention that are not exactly as described herein. It is the intent of the inventors that variations and equivalents of the invention are within the scope of the claims while the description, abstract and drawings are not to be used to limit the scope of the invention. The invention is specifically intended to be as broad as the claims below and their equivalents.

The invention claimed is:

1. A method, comprising:
   injecting steam into a formation containing hydrocarbons;
   recovering products including the hydrocarbons and condensate from the steam, wherein the products are recovered without relying on emulsification of the hydrocarbons and an aqueous phase;
   mixing a flocculant with the products, wherein particles suspended in the hydrocarbons agglomerate due to the flocculant and are transferred to the aqueous phase that includes the condensate; and
   separating the aqueous phase from the hydrocarbons, which have the particles removed to facilitate further processing of the hydrocarbons.

2. The method according to claim 1, wherein the flocculant is polymeric.

3. The method according to claim 1, wherein the flocculant is a polymeric imide.

4. The method according to claim 1, wherein the flocculant is a polymeric acrylate.

5. The method according to claim 1, wherein the flocculant is mixed with the products while the products are above 100° C.

6. The method according to claim 1, wherein the flocculant is mixed with the products while the products are between 100° C. and 175° C. and between 550 kilopascal and 1375 kilopascal.

7. The method according to claim 1, wherein the particles suspended in the hydrocarbons have an average particle size of less than 100 nanometers before agglomeration and are agglomerated to an average particle size of greater than 100 nanometers.

8. The method according to claim 1, wherein a ratio of the condensate to the hydrocarbons within the products is between 1 and 4.

9. The method according to claim 1, further comprising separating the aqueous phase from the particles that agglomerated.

10. The method according to claim 1, wherein the aqueous phase is recycled for additional steam injection.

11. The method according to claim 1, wherein the aqueous phase is recycled for additional steam injection after separating the aqueous phase from the particles that agglomerated.

12. A method, comprising:
   mixing a polymeric flocculant with products recovered from a wellbore and while still above 100° C., wherein particles suspended in hydrocarbons of the products agglomerate due to the flocculant and are transferred to an aqueous phase of the products and wherein the products are recovered without relying on emulsification of the hydrocarbons and the aqueous phase; and
   separating the aqueous phase from the hydrocarbons, which have the particles removed to facilitate further processing of the hydrocarbons.

13. The method according to claim 12, wherein the flocculant is mixed with the products while the products are between 120° C. and 150° C.

14. The method according to claim 12, wherein the flocculant is a polyimide.

15. A method, comprising:
   recovering fluid products removed by a wellbore from solids of a formation;
   mixing a flocculant with the products that are recovered, wherein particles suspended in hydrocarbons of the products agglomerate due to the flocculant and are transferred to an aqueous phase of the products and wherein the fluid products are recovered without relying on emulsification of the hydrocarbons and the aqueous phase; and
   separating the aqueous phase from the hydrocarbons, which have the particles removed to facilitate further processing of the hydrocarbons.

16. The method according to claim 15, wherein the recovering of the fluid products is by a steam assisted gravity drainage operation.

17. The method according to claim 15, wherein heat transfer to the hydrocarbons mobilizes the hydrocarbons in the formation to enable the recovering.

18. The method according to claim 15, wherein the flocculant is mixed with the products while the products are between 100° C. and 175° C. and between 550 kilopascal and 1375 kilopascal.

19. The method according to claim 15, wherein the flocculant is polymeric.

* * * * *